Nov. 8, 1960  C. V. GARRETT  2,958,876
FISHING FLOAT
Filed Aug. 13, 1958

CLEO V. GARRETT
INVENTOR.

BY *Loyal J. Miller*
ATTORNEY

United States Patent Office 2,958,876
Patented Nov. 8, 1960

2,958,876
FISHING FLOAT

Cleo V. Garrett, Box 165, Okemah, Okla.

Filed Aug. 13, 1958, Ser. No. 754,878

5 Claims. (Cl. 9—347)

The present invention relates to fishing and more particularly to a fishing float or means for supporting a fisherman adjacent the surface of the water.

Fishermen quite frequently desire to fish the off shore waters which are too deep to be waded and therefore require the use of a boat or other means for support. Since the use of a boat adds an expense to the fisherman for the rental thereof and quite frequently boats to be rented are not available, it is highly desirable to provide some means whereby the fisherman can fish in off shore water in a comparatively safe manner without materially adding to the cost of the equipment he must purchase.

It is therefore the principal object of this invention to provide a seat or fishing float which will support the fisherman adjacent the surface of the water.

Another object is to provide a fishing float which may be collapsed when not in use and which therefore will require only a comparatively small space for storage or transportation.

A further object of the invention is to provide a fishing float of this class for supporting a fisherman in a substantially erect manner.

An additional object is to provide a fishing float wherein the legs of the fisherman project downwardly into the water whereby movement of the fisherman's feet in a paddling manner propels him through the water.

Yet another object is to provide a fishing float of this character wherein the supporting seat may be vertically adjusted relative to the surface of the water.

Still another object is to provide a device for fishermen comprising relatively few parts and which may therefore be manufactured and sold at a relatively low cost.

The present invention accomplishes these and other objects by providing a pair of annular ring members of unequal diameter which are adjustably connected together on opposing sides of an inflated annular tube by a plurality of strap means. A seat is connected to a peripheral arc of one of the ring members and is adjustably connected at its forward end to the opposing ring member.

Other objects will be apparent from the following description when taken in conjunction with the accompanying single sheet of drawings, wherein.

Like characters of reference designate like parts in those figures of the drawings in which they occur.

In the drawings.

Figure 2:
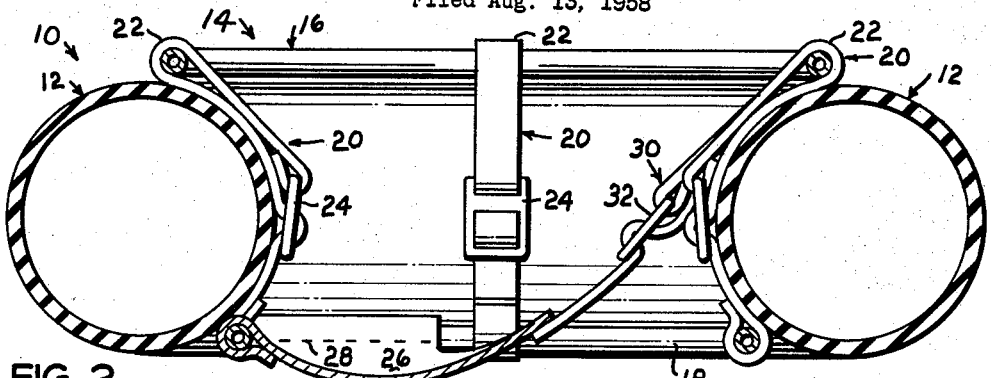
Figure 2 is a vertical cross sectional view of the device and its supporting tube; and, Figure 3 is a vertical cross sectional view, similar to Figure 2, illustrating one ring member and the attached seat in raised position.

The reference numeral 10 indicates the device, as a whole, comprising a conventional inflated annular tube 12 such as an inner tube and support means indicated generally at 14. The size of the tube 12 is not critical but I have found that a relatively large tube such as is used in large truck tires is very satisfactory from the standpoint of the amount of water displaced and the resultant amount of weight it readily supports as well as for other reasons which will readily be apparent.

Figure 1:
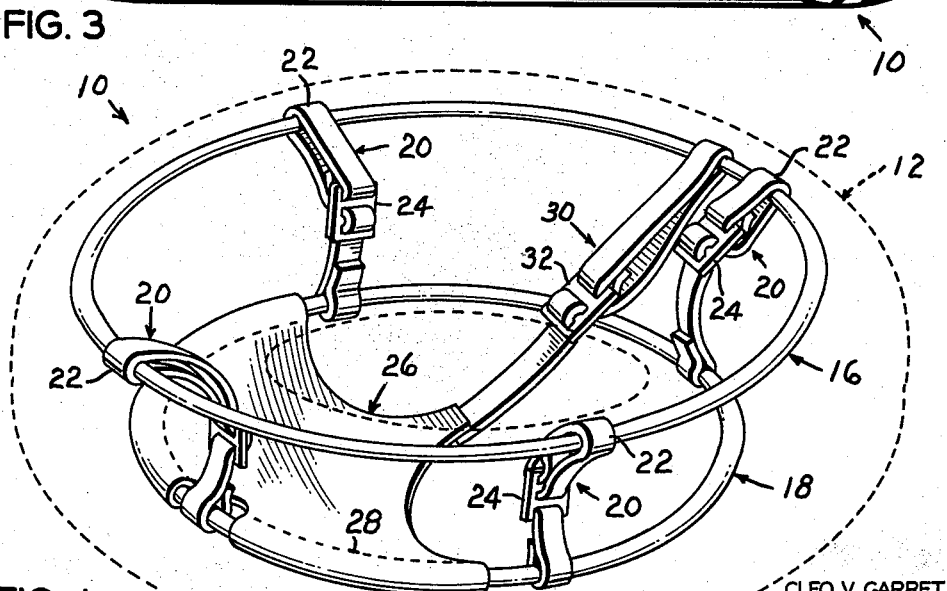
Figure 1 is a perspective view of the device in operative position and illustrating, in dotted lines, the relative position of the supporting tube.

The support means 14 includes a pair of annular tubular metallic ring members 16 and 18 interconnected by a plurality of adjustable strap members 20 extending therebetween. Diametrically the ring member 16 is preferably substantially equal to or slightly less than the mean diameter of the tube 12 so that the ring 16 may be supported by the upwardly disposed side of the tube as viewed in the drawings. Cross sectionally the ring member 16 is relatively small when compared to the cross sectional area of the tube 12. I have found that ¾ inch tubing is sufficiently rigid for forming both the ring members 16 and 18. Diametrically the ring member 18 is slightly greater than the inside diameter of the tube 12 and is normally disposed adjacent the lower side of the tube 12 as shown by Figs. 1 and 2. The strap members 20 may be formed of any suitable flexible material and are connected, at one end, to one of the ring members, for example, the ring member 18 while the other end of each strap member is doubled back upon itself to form a loop 22 which extends around opposite sides of the ring member 16 and is adjustably connected to itself by a conventional buckle or take-up link 24 or the like.

A semi-circular seat 26 formed of suitable fabric or other flexible material is connected to a peripherial portion of the ring member 18 by looping the circular edge of the seat around the ring member and stitching the doubled back edge to itself as at 28. An adjustable strap member 30 having a take-up link 32 is centrally connected to the forward edge portion of the seat 26 and looped around opposing sides of the ring member 16 for adjustably positioning the forward portion of the seat 26 relative to the plane defined by the ring member 18.

Operation

The support 14 is assembled with the tube 12 by inserting the ring member 18 through the inner periphery of the tube while the latter is deflated or at least partially deflated. The tube 12 is then inflated to the desired pressure and the strap members 20 are adjusted so that by transversely contacting the inner periphery of the tube 12 the two ring members 16 and 18 are coaxially held on opposing sides of the tube. The ring member 16 is preferably disposed on the upper surface of the tube when the latter is horizontally disposed. Thus the device may be placed in a body of water and the user may then be seated on the seat 26 with his legs on opposing sides of the strap member 30. Thus, it may be seen that, with a tube of sufficient size displacing a given quantity of water, the user of the device will be supported with the major portion of his body above the tube and above the water line, not shown, while his legs and feet project downwardly into the water. Movement of the user's feet in a paddling action permits progress through the water in a desired direction. Adjustment of the strap 30 raises and lowers the seat 26 thus permitting the user to ride deeper within the water or to be supported more upwardly of the water level as desired.

Figure 3:
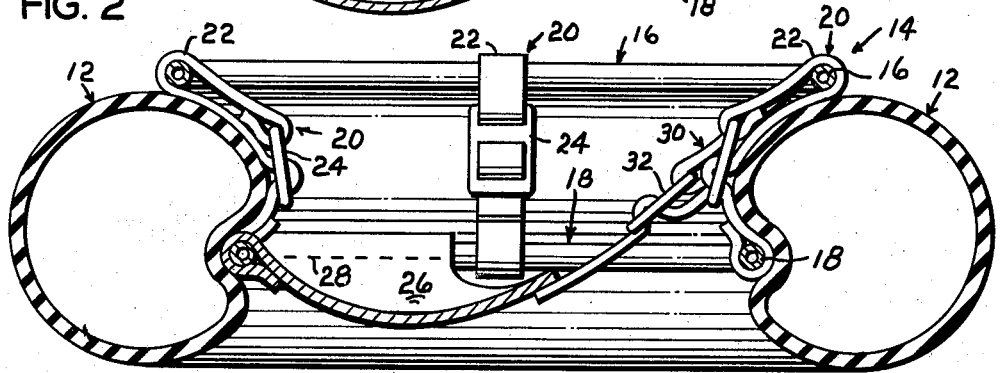

Further adjustment of the seat for supporting the user further out of the water may be accomplished by tightening the strap members 20 and drawing the ring member 18 upwardly toward the ring 16 as viewed in Fig. 3. When making such adjustment it may be necessary to partially deflate the tube 12 to permit the ring member 18 to deform the tube as shown.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A fishing float, including: an inflated annular tube; annular support members carried by said tube, said annular support members each having a diameter greater than the inside diameter of said annular tube; a seat secured to one said annular support member and adjustably secured to the other said support member; and strap members secured to said support members and transversely contacting an arc of the inner periphery of said annular tube.

2. A fishing float, including: an inflated annular tube; annular support members carried by said tube, said annular support members including annular rings diametrically smaller than said tube and contacting opposing sides of the latter; a flexible seat secured to one said annular ring and adjustably secured to the other said annular ring; and a plurality of strap members secured to and extending between said annular rings in contact with the inner periphery of said annular tube.

3. A fishing float, comprising: an inflated annular tube; annular support members carried by said tube, said annular support members comprising two annular ring members diametrically smaller than the outside diameter of said tube and coaxially contacting opposing sides of the latter; a flexible seat secured to one said annular ring and adjustably secured to the other said annular ring; and a plurality of strap members secured to and extending between said annular rings in contact with the inner periphery of said annular tube.

4. A fishing float, comprising: an inflated annular tube; annular support members carried by said tube, said annular support members comprising two annular ring members diametrically smaller than the outside diameter of said annular tube and coaxially contacting opposing sides of the latter; a flexible seat secured to a circumferential arc of one said ring member, said seat adapted to support a fisherman when seated thereon; strap means extending between said seat and the other said ring member for raising and lowering said seat; and a plurality of strap members secured to and extending between said annular rings in contact with the inner periphery of said annular tube.

5. A fishing float, including: at least two annular ring members of unequal diameter; a plurality of strap members extending between and connected with said two annular ring members, said strap members being adapted to transversely contact the inner periphery of an inflated annular tube and hold said ring members in coaxial relation on opposing sides of the tube; a seat adapted to support a fisherman when seated thereon, said seat being connected to a peripheral arc of the smaller of said annular ring members and having strap means extending between the forward portion of the seat and the large one of said annular ring members for raising and lowering the plane of the seat relative to the plane of the smaller one of said annular ring members.

References Cited in the file of this patent

UNITED STATES PATENTS

| | | |
|---|---|---|
| 2,246,108 | Sermon | June 17, 1941 |
| 2,761,155 | Headley | Sept. 4, 1956 |